UNITED STATES PATENT OFFICE.

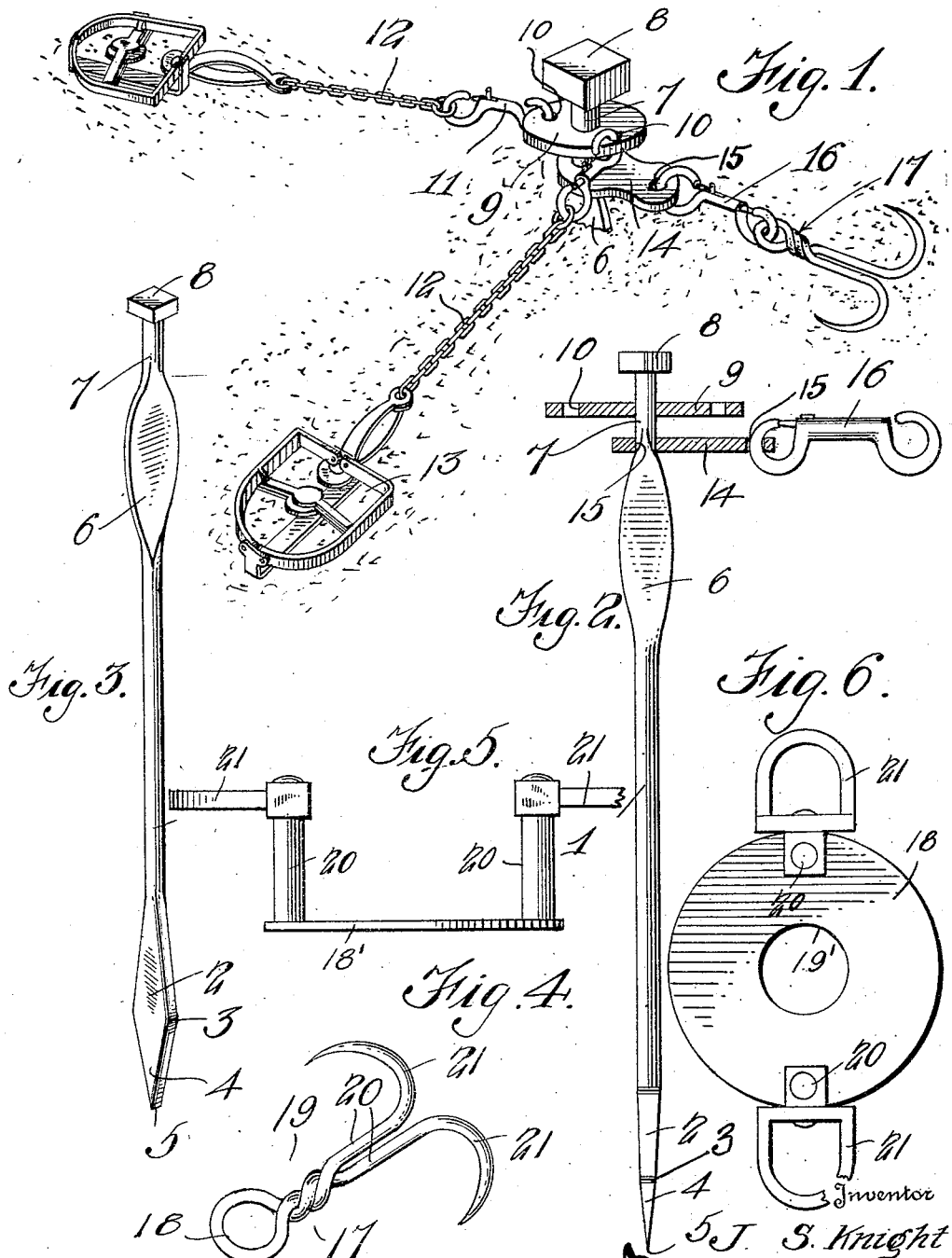

JOHN S. KNIGHT, OF LA JARA, COLORADO.

TRAP-STAKE.

1,309,036.  Specification of Letters Patent.  Patented July 8, 1919.

Application filed April 11, 1917. Serial No. 161,206.

*To all whom it may concern:*

Be it known that I, JOHN S. KNIGHT, a citizen of the United States, residing at La Jara, in the county of Conejos and State of Colorado, have invented certain new and useful Improvements in Trap-Stakes; and I do hereby declare the following to be a full, clear, and exact description of the invention, such as will enable others skilled in the art to which it appertains to make and use the same.

This invention relates to new and useful improvements in trap stakes or anchors, and the principal object of the invention resides in the provision of a stake which is adapted to be driven into the ground in order to anchor and secure traps and hold the trapped animal in order to prevent its escape.

Another object of the invention is to provide a stake having the trap secured to the ends of chains which are swivelly attached to the stake so that the circling of an animal about the stake will not loosen the same.

A further object of the invention is to provide a brush hook which is adapted to be attached to the stake in such a manner as to avoid the trap and stake from being dragged through the brush.

A still further object of the invention is to provide a means for holding the stake against turning movement in the ground, and yet facilitate the driving of the stake.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a view showing this stake in use;

Fig. 2 is a side elevation of the stake, showing the swivel connection of the chains and the brush hook in section;

Fig. 3 is a perspective view of the stake; and

Fig. 4 is a perspective view of the brush hook;

Fig. 5 is a side view in elevation of the modified form of collar; and

Fig. 6 is a top plan view of Fig. 5.

Referring to the drawing, the numeral 1 designates the stake shank provided at its lower end with a flat portion 2, the side edges of which incline outwardly as at 3 and then are inclined inwardly as at 4 to form a point 5. This point enables the stake to be readily driven into the ground. Formed at the upper end of the shank is a flat portion 6 the edges of which taper as clearly shown in the drawings and the upper terminal of the flat portion 6 terminates in the circular extension 7 and the head 8 formed thereon. A swivel plate 9 surrounds the extension 7 and is provided with a circular opening centrally thereof to receive the extension 7 and this plate is provided adjacent its edge with an annular series of openings 10 into which the snap hooks 11 of the connecting chains 12 are hooked. These chains 12 have secured to their opposite ends the game trap 13 and it will be seen that when an animal is trapped and starts to circle around the post, the plate 9 will rotate thereby avoiding any loosening of the post in the ground. A suitable link 14 is provided and has formed therein apertures 15 near opposite ends, one of which receives the circular portion 7 of the stake while the opposite aperture has extending therethrough, one end of the snap hook 16 the opposite terminal of which supports the brush hook designated generically by the numeral 17. This brush hook illustrated in Fig. 4, comprises a loop 18 the terminals of which are intertwisted as at 19 and the terminals of the intertwisted portion are then extended in parallel relation as at 20 to form a shank and are then bent outwardly in opposite directions to provide hooks 21. It will be apparent that should the stake become loosened, the brush hook will engage the brush as the device is dragged, thereby anchoring the trap and preventing the escape of the animal.

The modified form of collar illustrated in Figs. 5 and 6 comprises a plate 18' formed with a central aperture 19', which plate is provided at diametrically opposite points near its periphery with outwardly extending posts 20 having swivelly connected thereto the stirrup shaped loops 21. This collar is adapted to be used in place of the collar 9 when so desired and the loops 21 form a connection for the snap hooks 11.

It will be apparent from the foregoing, that in use the stake is driven in the ground and the traps are attached by passing their respective snap hooks through the openings, after which the whole is covered with leaves and the like, and it will be seen that when an animal steps into one of the traps the same will operate to grip and hold the animal and any attempt of the same to get away will be frustrated owing to the firm anchoring of the stake.

When it is desired to remove the stake, it will be understood that a wrench is placed on the upper end or squared head 8 and upon turning the stake it will be seen that the same is readily loosened.

While in the foregoing there has been shown and described the preferred embodiment of this invention, it is to be understood that such changes may be made in the combination and arrangement of parts as will fall within the spirit and scope of the appended claims.

In view of the fact that the struggle of the animal circling around the post will cause the swiveled collars to work downward along the post, the employment of a flattened top portion 6 as a support for the swiveled collar adds to the security of the anchoring means and avoids the drawback resultant from the employment of rings as supports which are easily broken off by the struggle of the animal.

What is claimed is:—

1. In a trap stake, the combination with a shaft pointed at one end and trap-securing means movably held to said shaft, and a collar at the other end of the shaft to retain the trap-securing means thereon, of laterally swaged oppositely arranged flat extensions on said shaft supporting said collar.

2. In a trap stake, the combination with a shaft pointed at one end and trap-securing means movably held to said shaft, and a collar at the other end of the shaft to retain the trap-securing means thereon, of additional anchoring means swivelly secured on said shaft, and oppositely laterally and gradually swaged extensions presenting longitudinally curved shoulders below said trap-securing and anchoring means and supporting the same.

3. In a trap stake, the combination with a shaft pointed at one end and trap-securing means movably held to said shaft, and a collar at the other end of the shaft to retain the trap-securing means thereon, of a laterally and gradually enlarged flattened extension on said shaft supporting said collar, and a flat portion near the pointed end substantially at right angles to the other flattened portion.

4. In a trap stake, the combination with a shaft pointed at one end, and trap-securing means movably held to said shaft, and a collar at the other end of the shaft to retain the trap-securing means thereon, of oppositely swaged gradually enlarged flat extensions on said shaft supporting said collar, and a laterally extending flattened portion of substantially elongated diamond shape near the pointed end of said stake, and substantially at right angles to the first-mentioned flattened portion.

In testimony whereof I affix my signature in presence of two witnesses.

JOHN S. KNIGHT.

Witnesses:
A. C. SAUNDERS,
H. O. SAUNDERS.

Copies of this patent may be obtained for five cents each, by addressing the "Commissioner of Patents, Washington, D. C."